United States Patent [19]
Narath

[11] Patent Number: 5,411,669
[45] Date of Patent: May 2, 1995

[54] PROCESS AND APPARATUS FOR TREATING PRE-CONCENTRATED SOLID-LIQUID MIXTURE STREAMS

[75] Inventor: Josef Narath, Kalsdorf, Austria

[73] Assignee: Andritz-Patentverwaltungs-Gesellschaft m.b.H., Graz, Austria

[21] Appl. No.: 42,764

[22] Filed: Apr. 6, 1993

[30] Foreign Application Priority Data

Apr. 6, 1992 [AT] Austria .................. A709/92

[51] Int. Cl.⁶ ............................................. B01D 33/80
[52] U.S. Cl. ...................................... 210/744; 100/45; 210/96.1; 210/143; 210/224; 210/400; 210/770; 210/780
[58] Field of Search ............... 162/17, 18, 56, 237, 162/238, 252, 262; 210/86, 91, 97, 109, 400, 401, 739, 744, 770, 780, 143, 251.1, 359; 100/35, 37, 39, 41, 45, 47, 99, 145, 151, 152, 117, 118; 26/96.1, 173, 224

[56] References Cited

U.S. PATENT DOCUMENTS

| | | | |
|---|---|---|---|
| 2,516,968 | 8/1950 | Faler | 210/400 |
| 3,085,624 | 4/1963 | Hortsman | 162/237 |
| 3,201,307 | 8/1965 | Hortsman | 100/145 |
| 3,601,039 | 8/1971 | Schover | 100/118 |
| 4,139,467 | 2/1979 | Fritzvold et al. | 210/359 |
| 4,612,123 | 9/1986 | Eustacchio et al. | 210/401 |
| 4,627,914 | 12/1986 | Antonenko | 210/96.1 |

FOREIGN PATENT DOCUMENTS

| | | | |
|---|---|---|---|
| 3029438 | 3/1982 | Germany | 210/225 |
| 3118715 | 12/1982 | Germany | 210/225 |
| 3126801 | 1/1983 | Germany | 210/193 |
| 3140341 | 4/1983 | Germany | 210/225 |

*Primary Examiner*—Joseph W. Drodge
*Attorney, Agent, or Firm*—Roylance, Abrams, Berdo & Goodman

[57] ABSTRACT

A process and apparatus for the treatment of pre-concentrated solid-liquid mixture streams, and in particular the dewatering of solid-liquid mixture streams metering the mixture from an intermediate container to a liquid separation device. The process accounts for variable inlet conditions or parameters of the solid-liquid mixture stream which is supplied to the intermediate container. A preset metering stream volume of the mixture is supplied to the liquid separating device for separating liquid by a metering device as a function of the level of the mixture in the intermediate container. The metering device can optionally comminute the solid-liquid mixture stream to be treated. The throughput rate of the liquid separating device is automatically adjusted according to the conveying rate of the metering device.

28 Claims, 3 Drawing Sheets

PROCESS AND APPARATUS FOR TREATING PRE-CONCENTRATED SOLID-LIQUID MIXTURE STREAMS

FIELD OF THE INVENTION

The present invention relates to a process and apparatus for the treatment of pre-concentrated solid-liquid mixture streams by separating liquid from the mixture streams as completely as possible by controlling the speed of the liquid separating device and the feed rate of the mixture. More particularly, the invention is directed to a process and apparatus for separating liquid from solid-liquid mixture streams, preferably streams of solid suspensions, such as fiber and pulp suspension or slurry streams and municipal sludges.

BACKGROUND OF THE INVENTION

Processes and apparatus for dewatering aggregates typically use worm presses, screen belt presses or the like. The apparatus is initially filled with pre-dewatered solid suspensions or slurry, and in particular, fiber suspensions, by means of conveying systems, such as, for example, conveyor belts. In these devices, controlling the speed and discharge rate of the dewatering apparatus is by either maintaining a constant level in the inlet chute or by maintaining a constant back pressure in the outlet of the dewatering apparatus. The known control systems for monitoring, processing and controlling the extent of dewatering of the suspension suffer from the major disadvantage that when the solid suspension supply varies during the process, the suspension is not effectively dewatered. For example, when the supply rate is too high, the suspension is not dewatered quickly enough so that the material supply system becomes choked and overflows. When the suspension supply rate is too low, the dewatering apparatus runs dry because of insufficient supply of suspension. These processing deficiencies reduce the efficiency of the system and produce a non-uniform output.

SUMMARY OF THE INVENTION

The present invention is directed to a process and apparatus for treating solid-liquid suspensions and slurries. In particular, the process and apparatus are directed to dewatering the solid-liquid suspension in an efficient manner by monitoring and controlling the input rate of the suspension into the dewatering apparatus and controlling the process rate within the dewatering apparatus in relation to the input rate.

Accordingly, it is a primary object of this invention to obviate the disadvantages and limitations of the previous processes of controlling the dewatering apparatus while providing a convenient and efficient dewatering process. The process and apparatus of the invention are particularly suitable in installations where the supply of the material to be dewatered is viable due to the process conditions and parameters of the solid-liquid mixture stream.

A further object of the invention is to provide a process and apparatus to initially feed the solid-liquid mixture to an intermediate container where the level of the mixture therein is continuously monitored by a level sensor probe.

Another object of the invention is to provide a metering device in or associated with the intermediate container to feed a selected volume of the solid-liquid mixture to the liquid separating apparatus at a predetermined and selected feed rate. A suitable controller is connected to a drive motor for the metering device to feed the mixture to the liquid separating device at a selected feed rate. The feed rate of the metering device may be in response to the level of the mixture in the intermediate container. The liquid separating device is similarly connected to a controller to adjust the throughput rate of the device in response to the feed rate of the metering device.

The objects and advantages of the invention are basically attained by a process for separating liquid from a solid-liquid mixture comprising feeding a solid-liquid mixture stream to an intermediate container; metering a predetermined volume of the mixture at a selected first feed rate from said intermediate container to a liquid separating device, and passing the mixture through the liquid separating device at a throughput rate and removing liquid from the mixture, the throughput rate of the mixture through the liquid separating device being responsive to and controlled by the feed rate of the mixture being metered to the liquid separating device.

Other objects and advantages of the invention are further attained by an apparatus for separating liquid from solid-liquid mixture streams comprising an intermediate container having an inlet for receiving and containing the mixture; a liquid separating device connected to the intermediate container for receiving the mixture therefrom and continuously removing liquid from the mixture, the separating device including a drive motor; metering means operatively connected to and cooperating with the intermediate container for metering the mixture to the liquid separating device at a selected feed rate; and control means for controlling the drive motor and throughput rate of the mixture through the liquid separating device in relation to the feed rate of the mixture from the intermediate container to the separating device.

These and other objects and salient features of the invention will become apparent from the following detailed description, which taken in conjunction with the annexed drawings, discloses preferred embodiments of the invention.

BRIEF DESCRIPTION OF THE DRAWINGS

Referring to the drawings which form a part of this disclosure.

DETAILED DESCRIPTION OF THE INVENTION

Figure 1:
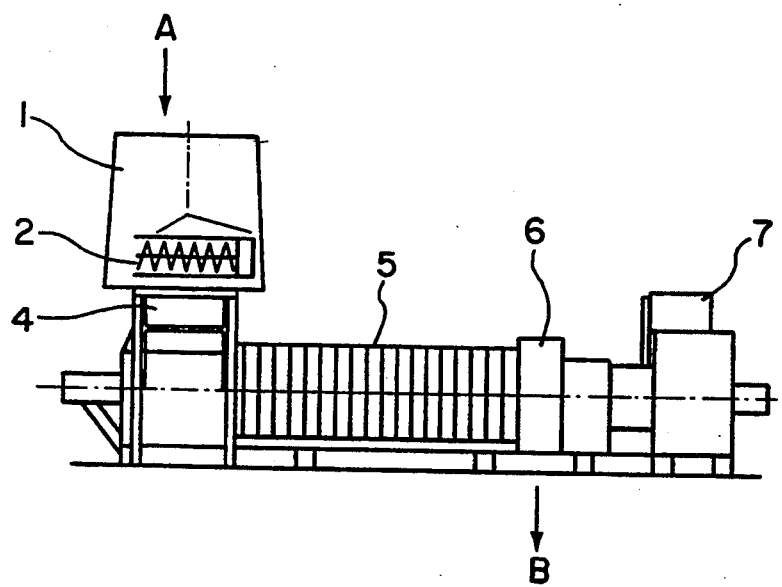
FIG. 1 is a side view of the apparatus for separating liquid from a solid-liquid mixture in accordance with a first embodiment of the invention.

The invention is directed to an apparatus for removing liquid from a solid-liquid mixture and a process of removing the liquid by controlling feed and processing rates in the apparatus. The apparatus essentially comprises an intermediate container 1, a metering device 2 operated by a drive motor 3, a liquid separating device 5 operated by a drive motor 7 and a control system 50.

By using an additional intermediate container 1 according to the present invention, a supply of a solid-liquid mixture exceeding the processing capacity of the liquid separating devices can be handled without loss or overflow of the mixture. The intermediate container 1 is dimensioned to receive the mixture from a supply source and store the mixture for extended periods of time until the mixture can be fed efficiently to the liquid separation device. Furthermore, the intermediate container of the present invention prevents the liquid separating device from running dry due to insufficient supply of mixture. Depending on the material parameters of the mixture to be treated and of the process parameters delivering the mixture to the intermediate container 1, the conveying rate of the metering device 2 associated with the intermediate container 1 is selected. According to one embodiment of the present invention, the conveying rate of the metering device 2 to the liquid separating device 5 is selected according to the desired throughput rate of the liquid separation device, so that a constant conveying stream in the metering device 2 provides a constant throughput rate in the liquid separation device 5. In addition, a preselected volume of the solid-liquid mixture can be metered to the liquid separating device at a selected feed rate. The throughput rate of the liquid separating device is in turn selectively determined by the dewatering performance of the liquid separation device, resulting in a controlled and selected solids content in the final product. In this way, a desired, constant solids content in the final product or final dry content may be obtained.

In a further embodiment of the invention, it is also desirable to control the level of the solid-liquid mixture in the intermediate container 1. Conveniently, according to the invention, the amount of solid-liquid mixture in the intermediate container 1 is maintained at an approximately constant level. Maintaining the preset level in the intermediate container 1 results in a very homogenous material composition in the region of the metering device 2. The level of the mixture in the intermediate container may be controlled by the feed rate of the mixture from the supply to the container 1 or by the metering rate to the liquid separating device 5.

The invention also relates to an installation or apparatus for the treatment of pre-concentrated solid-liquid mixture streams by separating liquid from such mixture streams as completely as possible. In particular, the invention is directed to dewatering of solid-liquid mixture streams, preferably streams of solid suspensions, such as fiber or pulp suspensions or slurries and municipal sludges. The slurry or suspension can be in the form of a press cake from a previous dewatering device.

Referring to the drawings, the intermediate container 1 is shown above the inlet 4 of the liquid separating device 5. The solid-liquid mixture 14 is fed to the intermediate container 1 as shown by arrow A from a processing source not shown. The solid-liquid mixture may be supplied from a suitable process station and delivered to the intermediate container 1 in bulk or batch form or supplied continuously depending on the processing of the mixture. The intermediate container 1 includes an inlet 16 in the upper end and an outlet 18 at the lower end thereof.

The metering device 2 as shown in the drawings is a standard screw conveyor-type metering device as known in the art for metering selected amounts of the solid-liquid mixture 14 through the outlet 18 of the intermediate container 1 at a controllable rate. As shown, the metering device 2 is positioned within intermediate container 1, although in alternative embodiments, the device 2 may be externally mounted.

Figure 2:
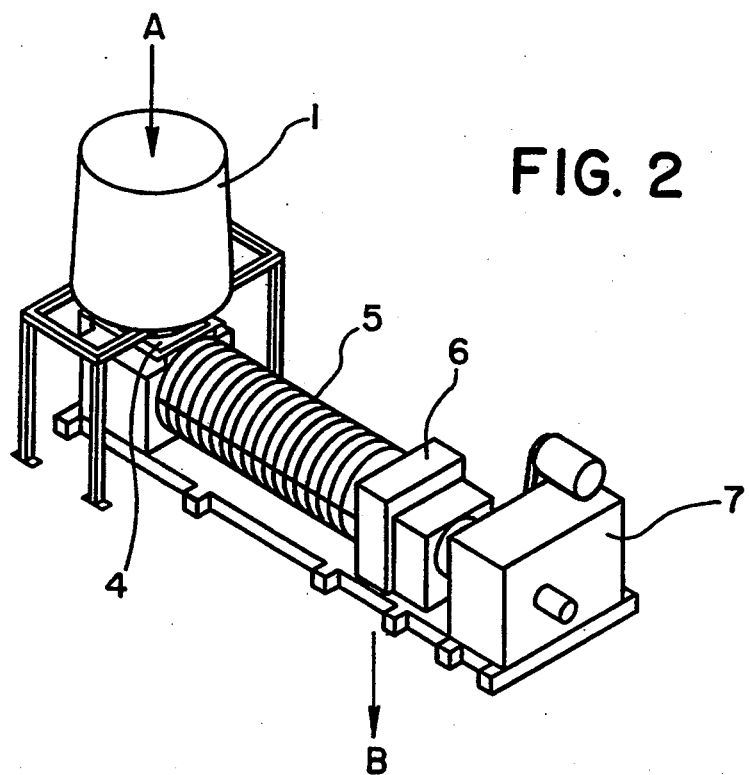
FIG. 2 is an elevated perspective view of the apparatus of FIG. 1.
Figure 3:
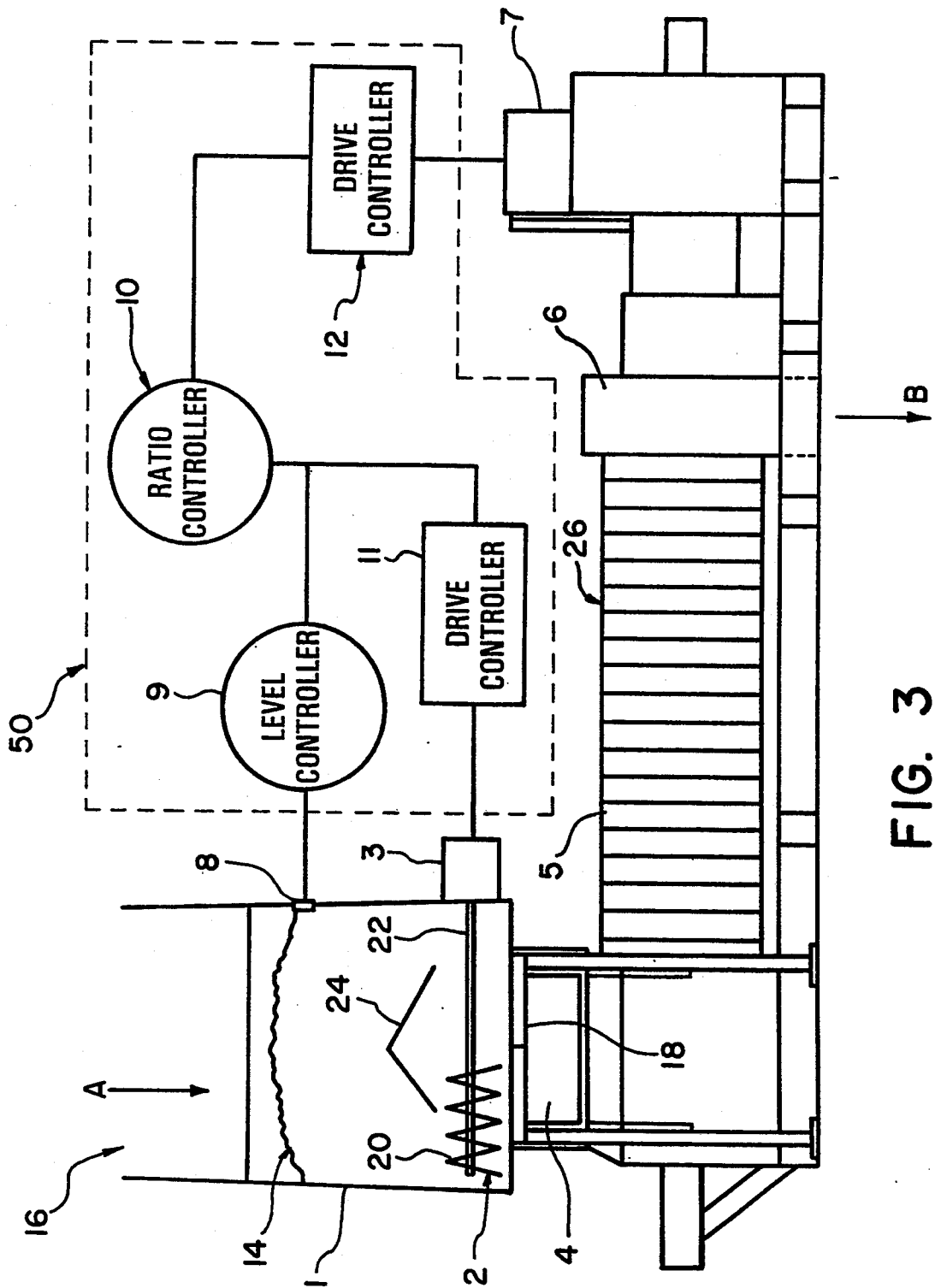
FIG. 3 is a side plan view of the apparatus of FIG. 1 and showing the control system for operating the apparatus.

In the embodiments shown, the metering device 2 includes a screw section 20 mounted on a shaft 22. The shaft 22 is operatively connected to and driven by a conventional drive motor 3. A shield or cover 24 is positioned above the outlet 18 and above a portion of the screw 20 to prevent the solid-liquid mixture from falling directly from the intermediate container to the inlet 4 of the liquid separating device 5. In the embodiment shown, the screw 20 of the metering device 2 includes conveyor elements for uniformly comminuting the solid-liquid mixture while simultaneously metering the mixture to the liquid separation device 5. The metering device 2 is able to supply uniformly comminuted pieces of the mixture 14 to the liquid separating device 5 for easy and efficient liquid removal. The liquid separating device 5 in a first preferred embodiment as shown in FIGS. 1–3 is a conventional worm press 5 as known in the art. The worm press 5 includes a screw having a plurality of screw turns in the barrel 26. The screw turns are progressively spaced closer together toward the discharge end such that the pressure within the barrel increases to express the liquid from the mixture. The separated solids are then discharged through an outlet 6 as shown by arrow B in FIG. 3. The worm screw liquid separating device 5 is operatively connected to a drive motor 7.

Figure 4:
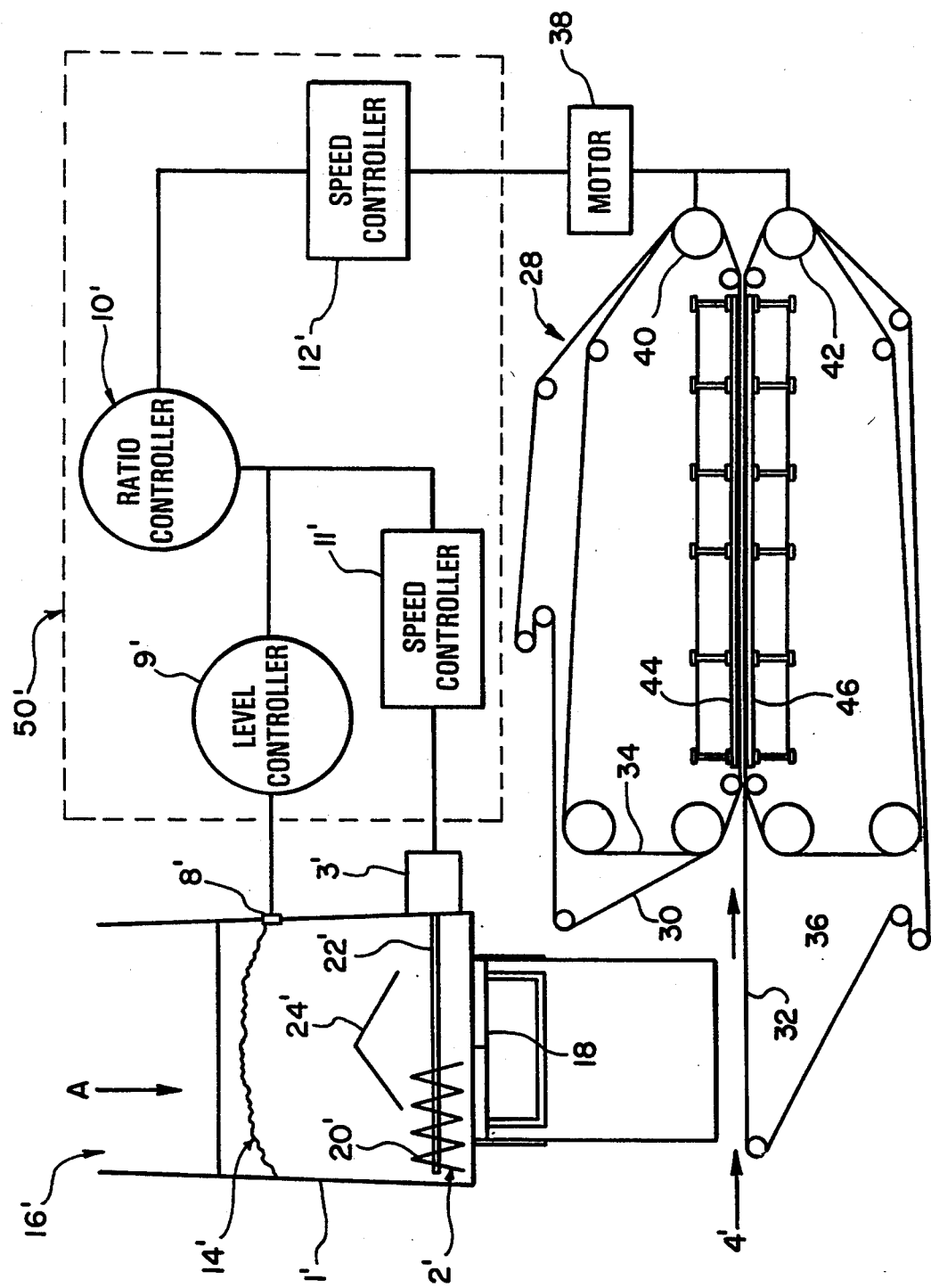
FIG. 4 is a side plan view of the apparatus and control system in an alternative embodiment of the invention.

In an alternative embodiment shown in FIG. 4, the liquid separating device 28 is a pair of opposing filter belts 30,32 and a pair of opposing pressure belts 34,36 as known in the art. The liquid separating device is driven by a suitable drive motor 38 connected to drive rollers 40,42. The filter belts 30,32 are generally sufficiently porous to allow the liquid to be expressed from the mixture as the belts pass between the pressure plates 44,46. The solid-liquid mixture is metered onto the leading end of the lower filter belt 32 which converges with the upper belt 30. The remaining elements of the apparatus are substantially the same as in the embodiment of FIG. 1 and thus, like elements are designated by the same reference numbers with the addition of a prime. In alternative embodiments, the liquid separating device may be a wire press or a double belt press as known in the art.

Referring to FIG. 3, the control system 50 of the apparatus monitors and adjusts the speed of the metering device 2 and the speed of the liquid separating device 5. A material level sensor 8 is provided in the intermediate container 1 to continuously monitor the level and amount of the solid-liquid mixture therein. The material level sensor 8 may be a conventional optical or electrical sensor as known in the art. The sensor 8 is connected to level controller 9. The level controller 9 is connected to a drive motor speed controller 11 which operates and controls the speed of the drive motor 3 of the metering device.

In the embodiment shown in FIG. 3, the frequency or speed of the motor 3 and the metering device 2 is continuously adjusted and monitored by the motor controller 11 and the level controller 9 to meter the mixture to the liquid separating device at a selected feed rate.

The level sensor may be used to actuate the metering device depending on the mixture level in the intermediate container to prevent the container from running dry or overflowing. The level controller 9 also may be used to control the speed of the apparatus supplying the mixture to the intermediate container so that supply is halted when the intermediate container is full. When the mixture in the intermediate container is too low, the level controller 9 may stop the metering device 2. Alternatively, as the supply rate of the solid-liquid mixture introduced to the intermediate container I fluctuates, the speed of the metering device 2 may be adjusted to maintain a constant level in the intermediate container as measured by the level sensor 8. The metering device 2 delivers the mixture to the liquid separating device 5 at a predetermined rate in response to signals from the level sensor 8 from the intermediate container.

The drive motor 7 of the liquid separating device 5 is operated by a rotary frequency or drive motor speed controller 12. The speed controller 12 is connected to a ratio controller 10 which is also connected to the metering device controller 11. The ratio controller 10 receives signals from the metering controller 11 responsive to the actual speed or frequency of the metering device 3 and thus, determines the feed rate of the mixture to the inlet of the liquid separating device 5. The ratio controller 10 calculates a throughput rate of the liquid separator 5 for a selected liquid separation performance and the required corresponding speed of the drive motor 7. A signal is transmitted to and received by the speed control 12 to adjust the speed or rotational frequency of the drive motor 7 and the liquid separating device 5. Accordingly, the throughput rate and the liquid separation performance of the liquid separating device 5 is automatically adjusted continuously as a function of the feed rate of the solid-liquid mixture to the device 5. By this process and apparatus of the invention, it is not necessary to accurately measure the back pressure in the outlet of the liquid separating device as in the processes previously employed. During start up of the apparatus, it is often desirable to adjust the speed of the metering device motor 3 by means of the speed controller 11 to determine the desired feed rate of mixture 14 to the liquid separation device 5. The controller 10 automatically adjusts the motor 7 to an appropriate speed to effectively dewater or treat the mixture to the desired consistency in the liquid separating device 5 as a function of the feed rate of the metering device.

In alternative embodiments, it is desirable to control the apparatus according to the discharge rate of the dewatered material and the extent of dewatering to attain a desired solids content. An optimum or desirable speed of the motor 7 and the liquid separating device 5 can be readily determined. Once determined, the selected speed of the motor 7 is set by the controller 12. The controller 12 then transmits a signal to the ratio controller 10 which calculates the optimum feed rate of the metering device 2 for the mixture to the liquid separating device 5. The ratio controller 10 then signals the drive controller 11 to operate the drive motor 3 at a designated speed to feed the mixture 14 from the intermediate container 1 to the liquid separating device 5 at the calculated rate. The level controller 9 is also connected to the drive controller 11 and the ratio controller 10 for feeding signals to the ratio controller 10 and drive controller 11 responsive to the level sensor 8 and the amount of the mixture in the intermediate container 1. In this manner, the ratio controller is able to calculate the desired speed of the metering motor 3 and the drive motor 7 of the liquid separating device. The speed of motors 3 and 7 can be controlled by the amount of the mixture in the intermediate container which is available for liquid separation.

The controllers 9, 10, 11 and 12 may be any suitable control device as known in the art. Typically, these controllers are microprocessors capable of carrying out their designated function.

While advantageous embodiments have been illustrated, it will be understood by those skilled in the art that various changes and modifications can be made therein without departing from the scope of the invention as defined in the appended claims.

What is claimed is:

1. A process for treating and separating liquid from solid-liquid mixture streams, comprising
   introducing said solid-liquid mixture stream into an intermediate storage container;
   conveying a predetermined volume of said mixture by metering said mixture at a first feed rate by metering means from said intermediate storage container to a liquid separating device, and
   passing said mixture through said liquid separating device at a second rate responsive to said first rate and removing liquid from said mixture, and adjusting the speed of said liquid separating device to obtain a selected solid-liquid content of said mixture and maintain a selected level of said mixture in said container.

2. The process of claim 1, wherein said solid-liquid mixture is concentrated before introducing to said intermediate storage container.

3. The process of claim 1, wherein said liquid separating device is a dewatering device.

4. The process of claim 1, wherein said solid-liquid mixture is a fiber-liquid mixture.

5. The process of claim 1, wherein said solid-liquid mixture is a pulp suspension, pulp slurry or municipal sludge.

6. The process of claim 1, further comprising comminuting said mixture while metering said mixture into said liquid separating device.

7. The process of claim 1, comprising feeding said mixture into said intermediate storage container at a rate whereby said mixture is maintained at a substantially constant level in said intermediate storage container.

8. The process of claim 1, comprising monitoring the level of said mixture in said intermediate storage container and metering said mixture to said liquid separating device at a rate responsive to said level.

9. The process of claim 1, comprising determining said first rate for metering said mixture to said liquid separating device, calculating a throughput rate for said liquid separating device in relation to said first feed rate, and adjusting the speed of said liquid separating device so that said second rate is adjusted to correspond to the calculated throughput rate.

10. An apparatus for separating liquid from solid-liquid mixture streams comprising:
    an intermediate storage container having an inlet and an outlet for receiving and containing a solid-liquid mixture;
    liquid separating means for continuously removing liquid from said mixture, said liquid separating means including drive means;
    metering means connected to said intermediate storage container for conveying a preselected volume of said mixture at a feed rate to said liquid separating means; and
    control means for controlling said drive means and a throughput rate of said liquid separating means in response to said feed rate of said mixture to said liquid separating means, said control comprising adjusting means for adjusting the speed of said drive means to obtain a desired solid-liquid content of said mixture and maintain a selected level of said mixture in said container.

11. The apparatus of claim 10, wherein said intermediate container includes level sensing means for sensing the level of said mixture in said intermediate storage container.

12. The apparatus of claim 10, and further comprising second control means operatively connected to said level sensing means and said metering means for controlling a metering rate of said mixture from said intermediate storage container to said liquid separating means.

13. The apparatus of claim 12, wherein said second control means includes means for adjusting said feed rate of said metering means in response to a level of said mixture in said intermediate storage container.

14. The apparatus of claim 10, wherein said metering means is a screw conveyor having a controllable drive motor connected to said control means.

15. The apparatus of claim 10, wherein said metering means includes comminuting means for comminuting said mixture before feeding said mixture to said liquid separating means.

16. The apparatus of claim 10, said liquid separating means includes a drive motor, said control means comprising speed control means, and said drive motor being connected to said speed control means for controlling the speed of said drive motor.

17. The apparatus of claim 10, further comprising level sensing means in said intermediate storage container for monitoring the level of said mixture therein, said control means comprising a level controller means connected to said level sensing means and to said metering means for selectively adjusting the operation of said metering means.

18. The apparatus of claim 17, wherein said level controller means maintains a selected level of said mixture in said intermediate storage container.

19. The apparatus of claim 10, wherein said liquid separating means comprises a worm press.

20. The apparatus of claim 10, wherein said liquid separating means comprises a filter screen press.

21. The apparatus of claim 10, wherein said control means comprises ratio controller means for calculating a selected ratio and adjusting the metering rate of said metering means and the throughput rate of said liquid separating means to said selected ratio.

22. The apparatus of claim 10, wherein said liquid separating means is a dewatering device.

23. A process for separating liquid from solid-liquid mixtures comprising:
   introducing said solid-liquid mixture into an intermediate storage container;
   continuously measuring the mixture level in said intermediate storage container by level sensing means in said intermediate storage container;
   conveying a preselected volume of said mixture at a first rate by metering said mixture from said intermediate storage container to a liquid separating device, said intermediate storage container including metering means for metering said mixture;
   passing said mixture through said liquid separating device at a throughput rate responsive to said metering rate, and separating liquid from said mixture and adjusting the speed of said liquid separating device to obtain a desired solid-liquid content of said mixture and maintain a selected level of said mixture in said container.

24. The process of claim 23, comprising selecting a throughput rate of said mixture through said liquid separating device, and adjusting said metering rate of said mixture in response to said selected throughput rate.

25. The process of claim 23, said liquid separating device including speed controller means connected to ratio controller means, said metering means including speed control means connected to said ratio controller means, said process comprising transmitting signals from each of said speed control means to said ratio controller means and determining a ratio of said metering rate and a throughput rate and adjusting said metering rate and said throughput rate to said ratio.

26. The process of claim 23, comprising metering said mixture from said intermediate storage container at a rate responsive to said mixture level in the intermediate storage container.

27. The process of claim 23, said level sensing means comprising a level sensor and level controller means, said metering means including a drive motor and speed controller means connected to said level controller means, said process comprising actuating said drive motor at a rate in response to said mixture level in said intermediate storage container.

28. The process of claim 23, comprising supplying said solid-liquid mixture from a processing station to said intermediate storage container.

* * * * *